(No Model.)
W. H. HARDEN.
ANIMAL TRAP.
No. 388,196. Patented Aug. 21, 1888.
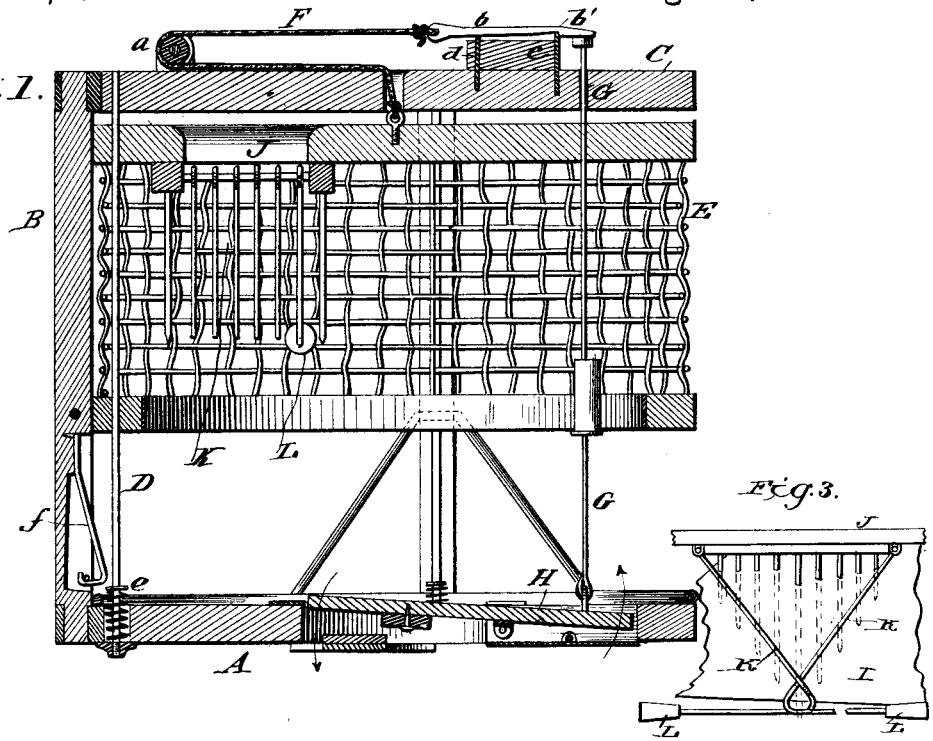
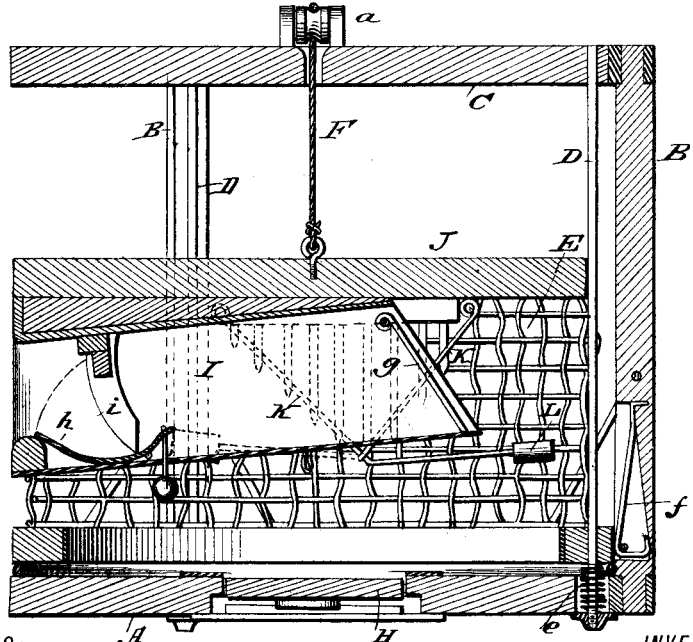
WITNESSES:
Fred J. Dieterich
Edw. W. Byrn
INVENTOR
Wm. H. Harden
BY Munn & Co.
ATTORNEYS.

UNITED STATES PATENT OFFICE.

WILLIAM H. HARDEN, OF QUITMAN, GEORGIA, ASSIGNOR OF ONE-HALF TO ISAAC B. HOPSON AND WILSON C. McCALL, OF SAME PLACE.

ANIMAL-TRAP.

SPECIFICATION forming part of Letters Patent No. 388,196, dated August 21, 1888.

Application filed June 12, 1888. Serial No. 276,900. (No model.)

*To all whom it may concern:*

Be it known that I, WILLIAM H. HARDEN, of Quitman, in the county of Brooks and State of Georgia, have invented a new and useful Improvement in Animal-Traps, of which the following is a specification.

My invention is in the nature of an improved animal-trap designed mainly for rats, but adapted also to catch smaller or larger animals; and it consists in the peculiar construction and arrangement of the cage, in combination with suspending, tripping, and locking mechanism, and in the combination, with the cage, of automatically-operating doors which permit the animals to enter, but will not allow them to escape, the doors being so arranged as to constantly set themselves after each animal is caught.

Figure 1 is a vertical central section with the cage raised. Fig. 2 is a vertical central section at right angles to the view given in Fig. 1, and showing the cage after it has fallen. Fig. 3 is a sectional detail of the inlet or door J.

A is a base-board, of a circular or other shape, connected by pillars B to a top, C, of similar shape. From the top C to the bottom A there extends just inside the pillars and parallel therewith guide-rods D. On these guide-rods there slides vertically the cage E, which, when in its elevated position, rests against the top C and gives free access to the base-board A below, and when it falls to its lower position imprisons any animal that may be upon the base-board. To hold this cage in its elevated position, a cord, F, is attached to it near the center and passes through the top C, and after passing around a pulley, a, is connected to a catch-bar, b, having a notch, b', in it that hooks over a lip or sharp edge, c, on a projection, d, thus holding the cage elevated. Just beneath the end of the catch-bar b there plays a push-rod, G, that extends down through the cage and rests upon the end of a treadle-lever, H, whose inner end is made circular and broad, so that when an animal steps upon the same the push-rod G is raised and forces the catch-bar b off the lip c and allows the cage to fall, imprisoning all the animals that may be under the same. To break the force of the fall of the cage, spiral springs e are arranged upon the guide-rods D, which receive the impact of the cage. To prevent the rise or rebound of the cage, as well as to prevent the animals from rooting under it, spring-catches f are arranged on the inner side of each pillar B, which catches lock against the upper edge of the lower rim of the cage and hold it down. After the cage has fallen the rats or other animals may still enter and be caught through either of the following inlets.

I is a side tube opening into the interior of the cage at one end and through the side of the cage at the other. At the inner end of this tube is an inclined door, g, made of open wire-work, and hung in an inclined position from the top, so that animals may pass under it and raise it in entering the cage, but cannot get out. Near the mouth or entrance to this tube is a cut-off door, h, which is bent up at its inner end, and is hinged near this point, so that when the animal passes over this and attempts to back out his weight on the inner turned-up end throws up the outer end of this door against a seat, i, on the tube and closes it, so that the animal is compelled to go into the trap and be caught. In the top of the cage is the other opening, J, which has two hinged doors of wire prongs, K K, which are held with their points together by counter-weights L L. These doors permit ingress to the cage by the animals, but prevent egress.

I am aware of the fact that it is not broadly new to provide a falling cage which is suspended from a point above, and is provided with tripping devices to allow it to fall upon and imprison the animal; and I therefore only claim my peculiar construction and arrangement of parts operating upon that general principle.

Having thus described my invention, what I claim as new is—

1. The combination, with the top and bottom sections, A and C, and the intermediate pillars, B, of the falling cage E, arranged between the pillars and the top and bottom sections, the cord F, attached to the top of the cage and passing through a hole and around a pulley, a, of the top section, catch-bar b, having a notch in the same and attached to the cord, lip c, fixed to the top section and adapted to engage with the said notch, the vertical push-rod G, resting beneath the catch-bar b and extending through the top section to the bottom, and the treadle H, attached to the push-rod and forming a part of the floor of the bottom section, substantially as shown and described.

2. The combination, with the top and bottom sections, A and C, and the pillars B, connecting them, the guide-rods D, also connecting the top and bottom sections parallel with the pillars, and having spiral springs $e$ wound around their lower ends, the falling cage sliding on the guide-rods, spring-catch $f$, attached to the lower ends of the pillars and adapted to engage the cage when down, and suspending and tripping mechanism, substantially as shown and described.

3. The falling cage E, having side inlet, I, having at its inner end an inclined door, $g$, and at its outer end a cut-off door, $h$, fulcrumed horizontally and having its inner end turned up, as described.

4. The falling cage E, having the top inlet, J, with horizontally-hinged doors K K, provided with counter-weights L L, for holding them together, substantially as shown and described.

WILLIAM H. HARDEN.

Witnesses:
G. M. CARTER,
JAMES D. WADE, Jr.